United States Patent
Wiggs

(10) Patent No.: US 7,841,383 B2
(45) Date of Patent: Nov. 30, 2010

(54) ENCASEMENT ASSEMBLY FOR INSTALLATION OF SUB-SURFACE REFRIGERANT TUBING IN A DIRECT EXCHANGE HEATING/COOLING SYSTEM

(75) Inventor: B. Ryland Wiggs, Franklin, TN (US)

(73) Assignee: Earth To Air Systems, LLC, Franklin, TN (US)

( * ) Notice: Subject to any disclaimer, the term of this patent is extended or adjusted under 35 U.S.C. 154(b) by 521 days.

(21) Appl. No.: 11/540,201

(22) Filed: Sep. 29, 2006

(65) Prior Publication Data
US 2007/0074847 A1    Apr. 5, 2007

Related U.S. Application Data

(60) Provisional application No. 60/722,353, filed on Sep. 30, 2005.

(51) Int. Cl.
F28D 1/04      (2006.01)
F28D 21/00    (2006.01)

(52) U.S. Cl. .......................................... 165/45; 62/260
(58) Field of Classification Search ................ 165/45; 62/260
See application file for complete search history.

(56) References Cited

U.S. PATENT DOCUMENTS

| | | | |
|---|---|---|---|
| 2,503,456 A | 4/1950 | Smith | 62/115 |
| 4,158,291 A | 6/1979 | Jones | 60/641 |
| 4,169,554 A | 10/1979 | Camp | 126/427 |
| 4,205,718 A | 6/1980 | Balch | 165/45 |
| 4,224,805 A | 9/1980 | Rothwell | 62/260 |
| 4,257,239 A | 3/1981 | Partin et al. | 62/238.7 |
| 4,286,651 A | 9/1981 | Steiger et al. | 165/45 |
| 4,290,266 A | 9/1981 | Twite et al. | 60/641.2 |
| 4,325,228 A | 4/1982 | Wolf | 62/260 |
| 4,375,831 A | 3/1983 | Downing, Jr. | 165/48 |
| 4,378,787 A | 4/1983 | Fleischmann | 126/430 |
| 4,383,419 A | 5/1983 | Bottum | 62/238.6 |
| 4,392,532 A | 7/1983 | Raggio | 166/372 |
| 4,448,238 A | 5/1984 | Singleton, Jr. et al. | 165/45 |
| 4,536,765 A | 8/1985 | Kaminski | 343/704 |
| 4,538,673 A | 9/1985 | Partin et al. | 165/45 |
| 4,544,021 A | 10/1985 | Barrett | 165/45 |
| 4,566,532 A * | 1/1986 | Basmajian | 165/45 |

(Continued)

OTHER PUBLICATIONS

Brookhaven National Laboratory, Formula for Environment-Friendly Grout Revives Heat Pump Industry in New Jersey and Wins Award for Brookhaven Scientists, Feb. 25, 2000.*

*Primary Examiner*—John K Ford
(74) *Attorney, Agent, or Firm*—Miller, Matthias & Hull LLP

(57) ABSTRACT

An encasement assembly for installing sub-surface refrigerant tubing in a direct exchange heating/cooling system includes a weighted and protective encasement tube for lowering the bottom distal U-bend portion of the refrigerant tubing into a well/borehole. The encasement tube has a main body portion and a rounded or cone-shaped nose. The U-bend portion of the distal end of the refrigerant transport lines is encased within a cementitious grout inside the tube. The grout inside the encasement tube has a flat top portion to prevent upward flotation and at least one eyebolt for securing a trimmie tube with an expendable wire during installation. An optional nose ring is attached to the lower distal end of the tube for marker float attachment in water.

24 Claims, 3 Drawing Sheets

U.S. PATENT DOCUMENTS

| | | | |
|---|---|---|---|
| 4,715,429 A | 12/1987 | Mogensen | 165/45 |
| 4,741,388 A | 5/1988 | Kuroiwa | 165/45 |
| D303,099 S * | 8/1989 | Rolofson | D10/109 |
| 4,858,679 A | 8/1989 | Sakaya et al. | 165/46 |
| 4,867,229 A | 9/1989 | Mogensen | 165/1 |
| 4,993,483 A | 2/1991 | Harris | 165/45 |
| 5,025,634 A | 6/1991 | Dressler | 62/79 |
| 5,025,641 A | 6/1991 | Broadhurst | 62/347 |
| 5,029,633 A | 7/1991 | Mann | 165/45 |
| 5,038,580 A | 8/1991 | Hart | 62/324.6 |
| 5,054,297 A | 10/1991 | Furuhama | 62/260 |
| 5,136,855 A | 8/1992 | Lenarduzzi | 62/129 |
| 5,199,486 A | 4/1993 | Balmer et al. | 165/47 |
| 5,224,357 A | 7/1993 | Galiyano et al. | 62/260 |
| 5,277,032 A | 1/1994 | See et al. | 62/125 |
| 5,313,804 A | 5/1994 | Kaye | 62/160 |
| 5,383,337 A | 1/1995 | Baker | 62/121 |
| 5,388,419 A | 2/1995 | Kaye | 62/160 |
| 5,419,135 A | 5/1995 | Wiggs | 60/641.2 |
| 5,461,876 A | 10/1995 | Dressler | 62/260 |
| 5,477,703 A | 12/1995 | Hanchar et al. | 62/260 |
| 5,477,914 A | 12/1995 | Rawlings | 165/45 |
| 5,533,355 A | 7/1996 | Rawlings | 62/260 |
| 5,560,220 A | 10/1996 | Cochran | 62/260 |
| 5,561,985 A | 10/1996 | Cochran | 62/260 |
| 5,564,282 A | 10/1996 | Kaye | 62/160 |
| 5,590,715 A * | 1/1997 | Amerman | 166/290 |
| 5,623,986 A * | 4/1997 | Wiggs | 165/45 |
| 5,651,265 A | 7/1997 | Grenier | 62/260 |
| 5,671,608 A | 9/1997 | Wiggs et al. | 62/260 |
| 5,706,888 A * | 1/1998 | Ambs et al. | 165/45 |
| 5,725,047 A | 3/1998 | Lopez | 165/149 |
| 5,738,164 A | 4/1998 | Hildebrand | 165/45 |
| 5,758,514 A | 6/1998 | Genung | 62/471 |
| 5,771,700 A | 6/1998 | Cochran | 62/117 |
| 5,816,314 A * | 10/1998 | Wiggs et al. | 165/45 |
| 5,875,644 A | 3/1999 | Ambs et al. | 62/324.6 |
| 5,937,665 A | 8/1999 | Kiessel et al. | 62/260 |
| 5,937,934 A | 8/1999 | Hildebrand | 165/45 |
| 5,941,238 A | 8/1999 | Tracy | 126/641 |
| 5,946,928 A | 9/1999 | Wiggs | 62/260 |
| 6,041,862 A | 3/2000 | Amerman | 166/290 |
| 6,138,744 A | 10/2000 | Coffee | 165/45 |
| 6,212,896 B1 | 4/2001 | Genung | 62/260 |
| 6,227,003 B1 | 5/2001 | Smolinsky | 62/324.1 |
| 6,251,179 B1 | 6/2001 | Allan | 106/719 |
| 6,276,438 B1 | 8/2001 | Amerman et al. | 165/45 |
| 6,354,097 B1 | 3/2002 | Schuster | 62/186 |
| 6,390,183 B2 | 5/2002 | Aoyagi et al. | 165/146 |
| 6,431,931 B2 * | 8/2002 | Johnson | 441/6 |
| 6,450,247 B1 | 9/2002 | Raff | 165/45 |
| 6,521,459 B1 | 2/2003 | Schooley et al. | 436/61 |
| 6,581,404 B2 | 6/2003 | Komatsubara et al. | 62/474 |
| 6,615,601 B1 | 9/2003 | Wiggs | 62/235.1 |
| 6,751,974 B1 | 6/2004 | Wiggs | 62/260 |
| 6,789,608 B1 * | 9/2004 | Wiggs | 165/45 |
| 6,892,522 B2 | 5/2005 | Brasz et al. | 60/39.2 |
| 6,932,149 B2 | 8/2005 | Wiggs | 165/45 |

* cited by examiner

ENCASEMENT ASSEMBLY FOR INSTALLATION OF SUB-SURFACE REFRIGERANT TUBING IN A DIRECT EXCHANGE HEATING/COOLING SYSTEM

CROSS-REFERENCES TO RELATED APPLICATIONS

This application is a Non-Provisional Utility application which claims benefit of co-pending U.S. Patent Application Ser. No. 60/722,353 filed Sep. 30, 2005, entitled "Mighty Missile DX Heating/Cooling System Vertical Well Copper Tubing Insertion Means" which is hereby incorporated by reference.

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to a geothermal direct exchange ("DX") heating/cooling system, which is also commonly referred to as a "direct expansion" heating/cooling system, comprising various design improvements and various specialty applications. More specifically, the present invention pertains to novel designs for encasements used to install refrigerant tubing in a vertical well DX heating/cooling system.

Geothermal ground source/water source heat exchange systems typically utilize fluid-filled closed loops of tubing buried in the ground, or submerged in a body of water, so as to either absorb heat from, or to reject heat into, the naturally occurring geothermal mass and/or water surrounding the buried or submerged fluid transport tubing. The tubing loop is extended to the surface and is then used to circulate either the naturally warmed or the naturally cooled fluid to an interior air heat exchange means.

Geothermal water-source heating/cooling systems of a traditional design typically circulate, via a water pump, a fluid comprised of water, or water with anti-freeze, in plastic (typically polyethylene) underground geothermal tubing so as to transfer geothermal heat to or from the ground in a first heat exchange step. In a second heat exchange step, a refrigerant heat pump system is utilized to transfer heat to or from the water. In a third heat exchange step, an interior air handler (comprised of finned tubing and a fan) is utilized to transfer heat to or from the refrigerant to heat or cool interior air space.

In more contemporary geothermal DX heat exchange systems, the refrigerant fluid transport lines are placed directly in the sub-surface ground and/or water. The fluid transport lines typically circulate a refrigerant fluid, such as R-22, R-410A, or the like, in sub-surface refrigerant lines, typically comprised of copper tubing, to transfer geothermal heat to or from the sub-surface elements via a first heat exchange step. DX systems require only a second heat exchange step to transfer heat to or from the interior air space, typically by means of an interior air handler. Consequently, DX systems are generally more efficient than water-source systems because fewer heat exchange steps are required and because no water pump energy expenditure is necessary. Further, DX systems are generally more efficient than water-source systems because copper is a better heat conductor than most plastics, and because the refrigerant fluid circulating within the copper tubing of a DX system generally has a greater temperature differential with the surrounding ground than the water circulating within the plastic tubing of a water-source system. Also, less excavation and drilling are typically required, and installation costs are typically lower, with a DX system as compared to a water-source system.

While most in-ground/in-water DX heat exchange designs are feasible, various improvements have been developed intended to enhance overall system operational efficiencies. Several such design improvements, particularly in direct expansion/direct exchange geothermal heat pump systems, are taught in U.S. Pat. No. 5,623,986 to Wiggs; in U.S. Pat. No. 5,816,314 to Wiggs, et al.; in U.S. Pat. No. 5,946,928 to Wiggs; and in U.S. Pat. No. 6,615,601 B1 to Wiggs, the disclosures of which are incorporated herein by reference. Such disclosures encompass both horizontally and vertically oriented sub-surface heat geothermal heat exchange means.

The present invention primarily relates to DX systems installed with vertically oriented sub-surface geothermal heat exchange apparatus, although an embodiment to utilize the invention in a lake or similar installation is also disclosed. Historically, copper refrigerant transport tubing is inserted within vertically oriented wells/boreholes by dropping and/or pushing the copper tubing into the wells. Several problems are encountered with this procedure. First, the refrigerant transport tubing is generally comprised of one smaller sized liquid copper refrigerant transport tube and one larger sized copper vapor refrigerant transport tube, coupled by means of a U-bend, or the like, at or near the lower distal end of the refrigerant transport tubing within the well. The lower distal end of the refrigerant transport tubing is subject to bending and/or other damage as it is lowered into the well and when it comes into contact with the bottom of the well. For example, the U-bend can be scraped, dented, punctured, or crimped. Any such damage can either impede the refrigerant flow and impair system operational efficiencies or create a refrigerant leak which renders the system totally useless.

Further, those of skill in the art understand that when refrigerant tubing is installed within a well, several other problems can periodically be encountered. One such problem is that casing is sometimes required to shore up-loose soil until solid rock is encountered. In such case, a smaller drill bit is extended through the casing and is then used to drill through the rock to the desired depth. As a result, a small, rounded ledge of rock is usually left at the point within the well where the casing stops and the drilling through the rock begins. This occurs because the smaller drill bit used to drill through the rock has a smaller diameter than the larger drill bit used to open a hole large enough for the casing. Casing, for example, may be 6 inches in diameter, whereas the drill bit through the lower rock may be only 4.5 inches in diameter. This small rock ledge quite often acts as an impediment to lowering the copper refrigerant transport lines into the well.

This small rock ledge also quite often acts as an impediment to lowering the trimmie tube into the well. A trimmie tube is used to pump grout into the well from the bottom to the top, so as to remove all air gaps once the copper tubing has been installed. A trimmie tube is often a 1 to 1.25 inch diameter polyethylene tube, or the like, with a round, open, distal end. The trimmie tube must be installed together with the copper tubing all the way to, or near, the bottom of the well. Often, even if the trimmie tube is able to be worked past a rock ledge by pushing, pulling, and twisting, the distal end of the tubing is damaged to the extent that the insertion of grout through the tube is impaired or even blocked.

Because trimmie tubes are generally stored in a coiled fashion, as are most soft copper refrigerant grade tubes, the "memory" of the plastic tube coil when it is being lowered into a confined, straight, and vertically oriented walled borehole/well causes the tubing to push against the interior walls of at least one of the casing and the rock well. Such abrasion is wearing on the tubing, and results in additional force being required in an effort to push the tubing down into the well from the top. Simultaneous pushing on soft copper tubing usually results in additional tubing abrasion, occasioned by the walls of the well, and increases the danger of kinking or otherwise damaging the copper tubing.

A third problem is that naturally occurring underground water is sometimes encountered within a well/borehole. While copper tubing is generally heavier than water, when the liquid refrigerant transport tube is insulated, the added displacement of the insulation results in flotation. This can require one to forcibly push the copper tubing, including the insulated liquid line, into the well in order to get it to the design depth at the bottom. Further, so as to prevent the copper tubing with an insulated liquid line from floating out of the well, the installer must secure the copper tubing at the top of the well.

A fourth problem encountered with a DX system, when an insulated liquid line is utilized, is that the insulation surrounding the liquid line displaces enough grout (Grout 111 is over twice the weight of water) so as to cause the copper tubing to float out of the well when the grout fill material is pumped in. This is a bothersome concern requiring the installer, as in the case of a well filled with water, to block, to tie down, or to otherwise secure the top of the copper tubing extending from the top of the well, at least until the grout cures if a cementitious grout, such as Grout 111 or the like, is utilized. Grout 111 is a shrink/crack resistant cementitious grout that is highly water impermeable that was developed by Brookhaven National Laboratory in New York and is well understood by those skilled in the art.

A fifth problem periodically encountered when installing DX system geothermal refrigerant transport tubing within a vertically oriented well/borehole is that rocks, particularly if shale or the like, can slide across the borehole, thereby impeding tubing installation. Efforts to eliminate such impediments were generally limited to either re-drilling and/or cleaning out the borehole, or to dropping a heavy steel bar, secured to the surface by a rope, into the hole in an effort to break through the barrier. These conventional methods required significant extra time and labor.

Consequently, a method is needed for efficiently and safely installing copper tubing, particularly when at least one of the refrigerant transport lines is insulated. Also needed is a method for efficiently and safely installing the trimmie tube to be used for grouting, so as to avoid the problems of tubing damage, abrasion, blocking rocks/ledges/rims, and flotation.

BRIEF SUMMARY OF THE INVENTION

It is an object of the present invention to enhance and improve the efficiency and safety of conventional direct expansion, geothermal heating/cooling system, sub-surface, vertically oriented, copper tubing installations, as well as more horizontally oriented lake installations. This is accomplished by providing a wide (relative to the diameter of the borehole/well), weighted, and elongated, encasement assembly comprising an encasement tube with a flat top and with at least one of a rounded and a cone shaped bottom end, within which to insert the copper tubing and the trimmie tubing as it is being lowered into the well/borehole. This configuration also allows the installer to easily pull a loosely attached trimmie tube loose from the tube without damaging the copper refrigerant transport tubing. Such an encasement assembly, because a preferred embodiment has dimensions similar to a torpedo, can sometimes be referred to as a "torpedo" design.

The encasement assembly of the present invention is comprised of an encasement tube, or the like, made of steel, PVC, copper, metal, plastic, or the like, that is longer than it is wide. The encasement tube has a main body portion with a flat upper top portion. The width of the main body portion, for use in a 4.5 inch diameter well/borehole for example, would preferably be in the 2.5 inch to 3 inch range, while the width for use in a larger diameter well/borehole could be larger, with preferably at least a 1 inch diameter clearance. The length of the encasement tube would be at least longer than the width of the well/borehole, so as to prevent the encasement tube from turning sideways in the well. The length should preferably be at least longer than the U-bend portion of the copper refrigerant transport tubing, and should be long enough, so that when combined with its contents, will achieve the desired weight. The weight of the completed encasement tube should preferably be in the 10 pound to 40 pound range. The heavier the encasement (25 to 40 pounds), the easier it is to install the copper tubing in a water-filled well. The lighter the encasement tube (10 to 20 pounds), the easier it is to pull out the copper tubing for any necessary repairs via pressure testing prior to grouting.

The encasement tube of the present invention should preferably have a main body portion of relatively constant diameter and at least one of a rounded and a cone-shaped nose, or the like, extending from the base of the main body portion of the tube. A cone-shaped nose end is preferable because it helps to guide the encasement tube past any rock ledges. It also allows the weight of the encasement assembly, and its accompanying/attached refrigerant transport tubing, to more easily break through any sub-surface materials that may have worked their way partially or totally across the well or borehole. The U-bend of the copper tubing within the encasement tube should be positioned at least 1 inch, and preferably 2 inches, above the base of the main body portion of the encasement tube, so that if the rounded or cone-shaped nose breaks off, the refrigerant transport tubing will not be damaged.

The distal end of the refrigerant transport tubing is placed within the encasement tube and may optionally include a heating mode pin restrictor assembly, as would be well understood by those skilled in the art. At least one, and preferably two, eye bolts, or the like, are placed near the top of the encasement tube in a manner so that the rounded eye bolt end of each respective bolt extends slightly above the top rim of the tube, but extending only enough for a wire, a line, or other fastening means, to extend across the top of the encasement tube rim and through the rounded top of the eye bolt. The eye bolt(s) will be used for securing the trimmie tube to the encasement tube so as to retain the distal lower end of the trimmie tube within the interior shell of the main body portion of the encasement tube while allowing the trimmie tube to be easily pulled loose without damaging the refrigerant transport tubing when grouting commences. This requires enough room to be left within the top interior of the encasement tube to fit the refrigerant transport tubing and the trimmie tube. For example, 1 to 2 inches may be left open (not filled with a flat topped grout) within the top interior portion of the encasement tube.

The optional second eyebolt, or the like, is situated near the top of the encasement tube in a position so as not to impair the insertion of the trimmie tube around the first eyebolt. The second eyebolt, which, for example, may be a 1.25 inch long eyebolt, or the like, is optionally used to secure a rope, line, wire, chain, or the like to the encasement to control the descent of the encasement and its attached refrigerant transport tubing and trimmie tube into the well and/or to be used in raising the assembly up within, or out of, the well for servicing prior to grouting. For example, if a leak is detected during the pressure test prior to grouting, the rope can be used to help raise the entire encasement assembly to the point where the leak is located and repaired. Thereafter, the rope can be used to re-lower the assembly back down into the well.

After the refrigerant transport tubing and its U-bend have been inserted into the encasement tube, and eye bolt(s) have been secured in place (via a stiff wire, or the like, through each eye bolt running across the top of the containment tube), concrete, cement, Grout 111, or the like, is used to fill the rest of the interior of the encasement tube up to a point about 1 to 2 inches from the top. The encasement tube is filled to a point that is at least high enough to generously cover the lower portion of the eye bolt, including the nut or bent lower distal end of the eyebolt, in a manner so that the threaded end of the eyebolt is firmly secured in the cementitious grout or other fill material. The fill material fills the entire remaining volume of the containment tube, including the rounded or cone-shaped nose, except for the approximate one to two-inch segment near the top of the encasement tube, so as to leave adequate room for the trimmie tube lower distal end to be fully protected within the encasement tube as the assembly is lowered into the well.

The cementitious fill material near the top of the encasement tube is left level and flat within the tube. This provides a flat plate for water, if any water naturally occurs within the well, and for the heavy grout well/borehole fill material to push against as the grout is added within the empty annular space of the well/borehole over the top of the encasement tube, from the bottom to the top of the well/borehole. This design utilizes the weight of the grout against the flat surface of the top of the encasement, near the bottom of the well, as well as the additional weight of the grout filled encasement tube, to prevent the refrigerant transport tubing, in conjunction with any insulation around the liquid line portion of the refrigerant transport tubing, from floating out of a water-filled well, and from floating out of a well as the grout/fill material is added and cures.

Periodically, it will be advantageous to install the sub-surface geothermal heat exchange refrigerant transport tubing at the bottom of, or within, a lake, a river, a bay, a creek, a stream, a sea, or the like. In such a situation, it is unnecessary to drill a well/borehole, as any body of water of sufficient size not to freeze to the bottom when heat is withdrawn, via a DX heating/cooling system, and of sufficient size not to evaporate when heat is rejected into same during the cooling mode of operation, will typically provide excellent geothermal heat exchange properties. In such an application, the eye bolt for a rope attachment would preferably be placed at the lower distal end of the nose of the encasement tube. In the alternative, a small hole could be drilled through the cone-shaped nose of the encasement tube of sufficient size to insert a rope, such as a wire rope, a nylon rope, a plastic rope, or the like. The rope would be used to pull the encasement tube and its attached refrigerant transport lines into position. In such an installation, the encasement tube is useful to pull the refrigerant transport tubing into position, as well as to help anchor the distal end of the refrigerant transport tubing into position, via the weight of the encasement.

Additionally and optionally, a rope/line, or the like, may be attached to the eye-bolt or through the small hole at the end of the cone-shaped nose of the encasement tube, which rope/line is attached to a flotation device, such as a buoy, or the like, to mark the sub-surface location of the encasement assembly and to assist in accessing same for moving or for servicing if ever desired.

DETAILED DESCRIPTION OF THE INVENTION

Figure 1:
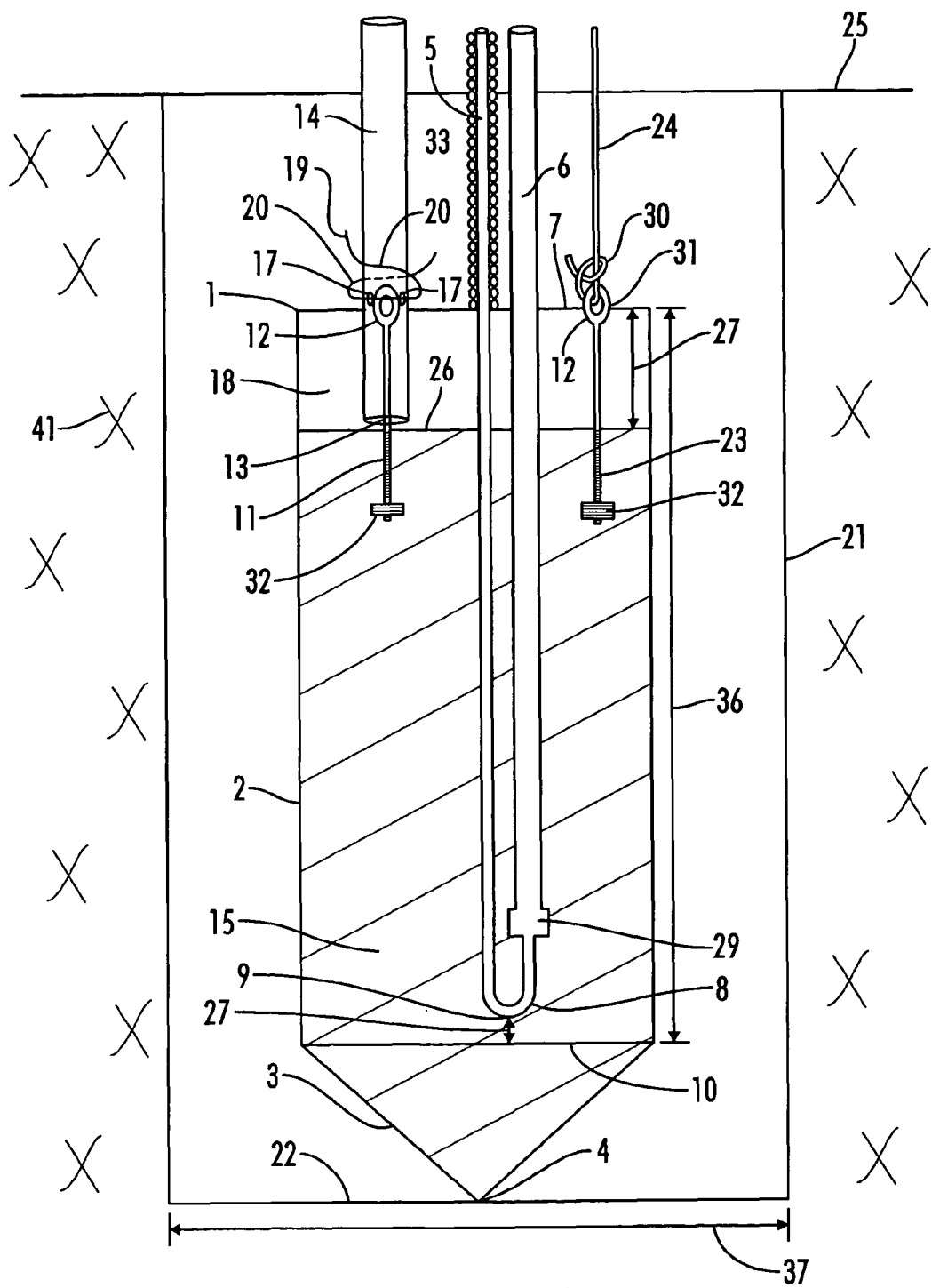
FIG. 1 is a cut-away side view of one embodiment of the encasement assembly of the present invention showing an encasement tube having a cone-shape nose and main body portion with a flat top, situated within a well/borehole, with attached liquid and vapor refrigerant transport lines, a trimmie tube attached to an eyebolt extending from the grout fill within the encasement tube, and an attached rope.

Referring now to the drawings in detail, where like numerals refer to like parts or elements, there is shown in FIG. 1 a cut-away side view of one embodiment of the encasement assembly 1, comprising an encasement tube 2 with a cone-shaped nose 3 extending from the base 10 of a main body portion. The main body portion of the tube 2 (along length 36) is shown here as substantially cylindrical, formed from steel, copper, metal, or plastic pipe, or the like. The encasement tube 2 does not necessarily have to be cylindrical, as is well understood by those skilled in the art. For example, the tube 2 may be multi-flat sided, or the like (not shown herein as multi-flat sided tubing is well understood by those skilled in the art). The main body portion of the encasement tube 2 is longer 36 than the width 37 of the well/borehole 21 so that the encasement assembly 1 cannot turn sideways during its installation into the well/borehole 21. The well/borehole 21 is drilled/dug into the ground 41, with such drilling process being well understood by those skilled in the art.

The cone-shaped nose 3 of the tube 2 is preferably approximately six inches long, coming to a point at the bottom end 4. The nose 3 can be attached to the main body portion of the encasement tube in a manner to allow the nose 3 to separate from the main body portion during installation. A liquid refrigerant transport line 5 is shown, a distal end of which is shown in the form of a U-bend 8 at a point about two inches 27 above the flat base 10 of the main body portion of tube 2. The liquid line 5 is attached by a coupling 29 to the vapor refrigerant transport line 6, all within the encasement tube 2. The top end 7 of the tube 2 is flat. The distal end or bottom 9 of transport lines (at U-bend 8) should preferably be situated about two inches 27 (not drawn to scale here) from the base 10 of the tube 2, so that if the cone-shaped nose 3 breaks off during insertion into a well/borehole 21, the U-bend 8 will not be damaged. The encasement 1 is shown here as being positioned at the lower end 22 of a well/borehole 21. The well/borehole 21 is drilled/dug into the ground 41, with such drilling/digging processes being well understood by those skilled in the art.

In the embodiment of FIG. 1, a first eyebolt 11 is shown with its rounded head 12 extending only slightly above the top 7 of the encasement tube 2. The first eyebolt 11 is used as a means to secure the lower distal end 13 of a trimmie tube 14 to the encasement assembly 1. The trimmie tube 14 is conventionally a polyethylene tube utilized for insertion of a grout fill 15 into a geothermal well/borehole 21, as is well understood by those skilled in the art. A lower portion of eyebolt 11, including nut 32, is positioned totally within the grout 15 so as to secure the eyebolt 11 in place. The trimmie tube 14 is preferably placed over and around the portion of the first eyebolt 11 extending above the grout/fill material 15, in a manner so that the entire lower distal end 13 of the trimmie tube 14 is within the interior of the upper portion 18 of the tube 2 that is not filled with grout 15. A small hole 17 is drilled through both sides of the trimmie tube 14 so as to permit a wire 19, or the like, to be inserted through the small holes 17 in a manner so as to extend through the rounded head 12 of the first eyebolt 11. The wire 19 is then bent around 20 the trimmie tube 14 to hold the trimmie tube 14 in place when the encasement 1 is lowered into the well 21, but so as to easily be broken or pulled loose when the trimmie tube 14 is pulled up and away from the encasement 1 during the grouting process without damaging either the liquid or the vapor refrigerant transport lines, 5 and 6.

An optional second eyebolt 23 is shown positioned within the encasement tube 2 in a manner similar to the first eyebolt 11, but at a position 31 where it does not interfere with either the trimmie tube 14 or the liquid and vapor refrigerant transport lines, 5 and 6. An optional rope 24, such as a nylon rope, a wire rope, or the like, is attached to the rounded head 12 of the second eyebolt 23 and extends up through the well 21 to a point above the ground surface 25, where it can be attached to a winch (not shown herein as winches are well understood by those skilled in the art), or the like, for assistance in either lowering or raising the encasement assembly 1 and its additionally attached trimmie tube 14 and refrigerant transport lines, 5 and 6, within the well/borehole 21.

The remainder of the interior of the encasement tube 2 is shown as being filled with a grout/fill material 15 (which is preferably a cementitious grout such as Grout 111 or the like) to a point about two inches 27 (not drawn to scale) below the top 7 of the tube 2, so as to leave room for the lower distal end 13 of a trimmie tube 14 to totally fit with the interior upper portion 18 of the trimmie tube 14. This protects the lower distal end 13 of the trimmie tube 14 from becoming damaged or disfigured as it is lowered into the well 21. The grout/fill material 15, which is preferably a cementitious grout such as Grout 111 or the like, is left with a flat surface 26 at a point about two inches 27 below the top 7 of the tube 2. The flat surface 26 will provide resistance helping to prevent the encasement assembly 1 and its attached refrigerant transport tubing, 5 and 6, together with any insulation 33 surrounding the liquid line 5, from floating out of the well 21 if the well contains natural water fill (natural water fill is not shown herein as such is well understood by those skilled in the art), and to help prevent the encasement assembly 1 from floating out of the well 21 during the grouting process (the grouting process is well understood by those skilled in the art). A cementitious grout, such as Grout 111, is preferred as a fill material for the tube 2 because it is shrink resistant, crack resistant, water resistant, and highly heat conductive when compared to other conventional grouts. Also, Grout 111 is relatively heavy, weighing about 18.5 pounds per gallon (over twice the weight of water) and will therefore displace any water naturally occurring within the well/borehole 21 (not shown).

Figure 2:
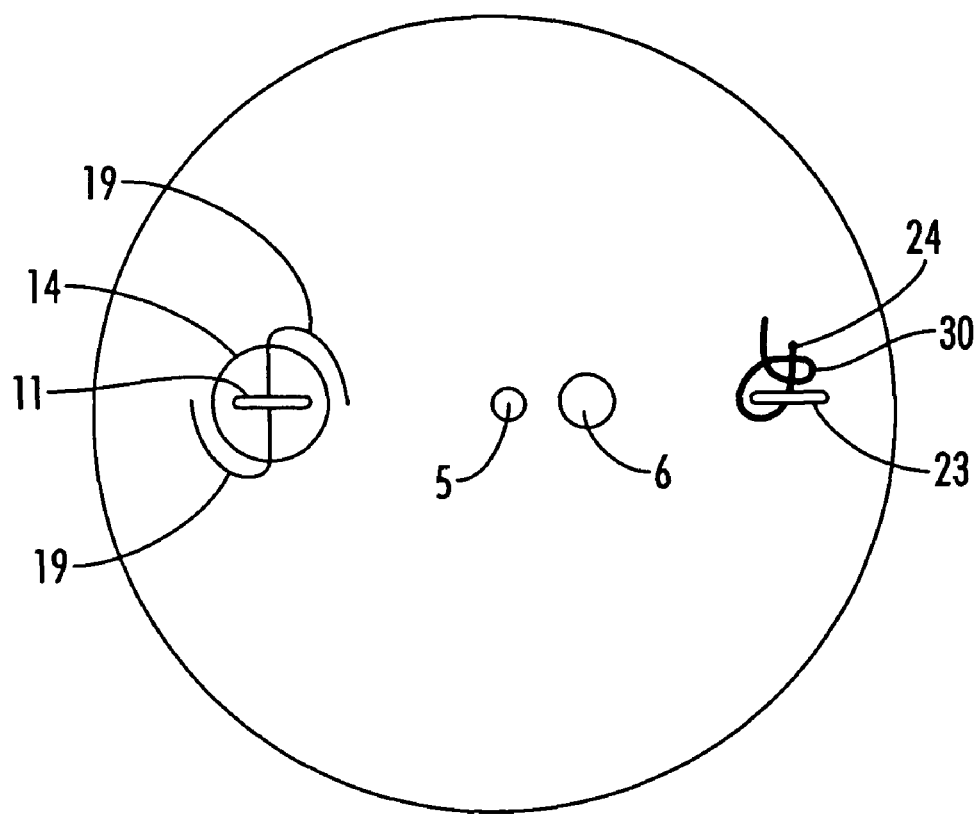
FIG. 2 is a top view of the encasement assembly of the present invention, showing an extended smaller diameter liquid refrigerant transport line, an extended larger diameter vapor refrigerant transport line, a trimmie tube attached to a first eyebolt with a wire, and a rope tied to an optional second eyebolt.

FIG. 2 shows the top of the encasement assembly 1, with a smaller diameter liquid refrigerant transport line 5, a larger diameter vapor refrigerant transport line 6, a trimmie tube 14 attached to a first eyebolt 11 with a wire 19 securing the trimmie tube 14 to the first eyebolt 11 within the tube 2 for protective purposes, and a rope 24, or the like, secured 30 to an optional second eyebolt 23 for optional assistance in raising and/or lowering the entire assembly 1.

Figure 3:
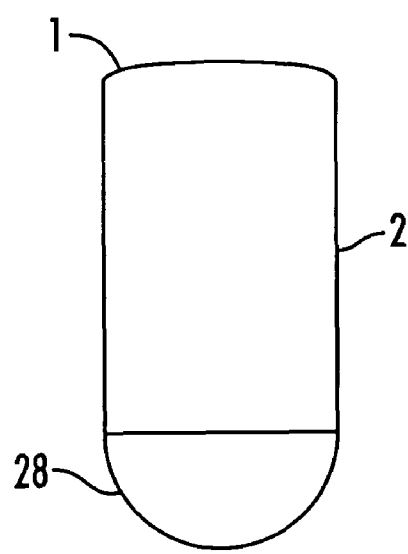
FIG. 3 is a side view of an embodiment of the encasement assembly tube of the present invention in which the encasement tube has a rounded nose.

FIG. 3 is a side view of another embodiment of the encasement assembly 1 in which the encasement tube 2 has a rounded nose 28.

Figure 4:
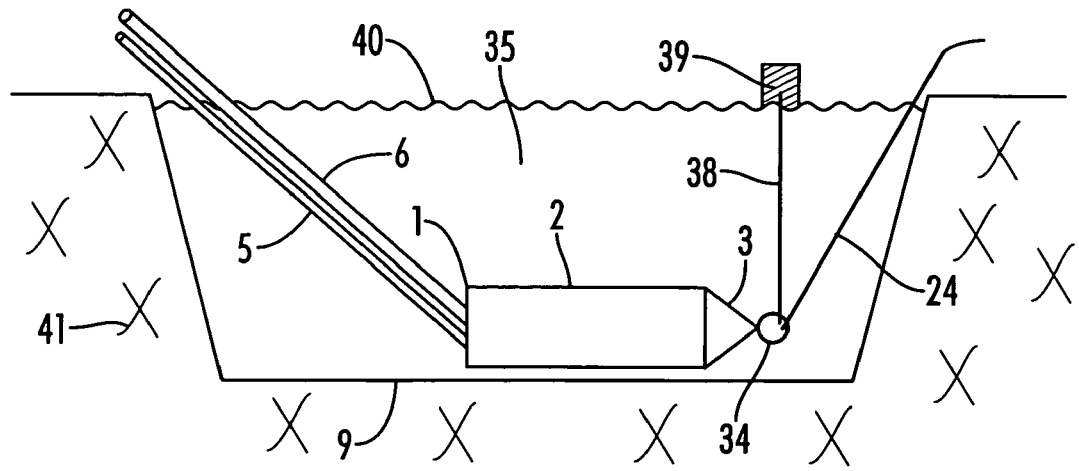
FIG. 4 is a side view of an embodiment of the encasement assembly of the present invention positioned in lake water and having a ring at the distal end of the cone-shaped nose of the encasement tube. The ring is used to provide an optional attachment point for a rope to be utilized to pull the encasement tube and its pre-assembled attached liquid and vapor refrigerant transport tubing into position at the bottom of, or within, a lake. An optional line is also shown as being attached to the ring, and is shown as extending up to a flotation device to mark the location of the encasement assembly at the lake surface.

FIG. 4 is a side view of another embodiment of the encasement assembly 1 and tube 2 having a ring 34 at the distal end 13 of the cone-shaped nose 3. The ring 34 could be an eyebolt, a hook, a U-bolt, or the like, as would be well understood by those skilled in the art. The ring 34 is used to provide an optional attachment point for a rope 24, such as a wire rope, a nylon rope, or the like, as would be well understood by those skilled in the art. The rope 24, in this particular application, would be utilized to pull the encasement assembly 1 and its pre-assembled attached liquid and vapor refrigerant transport tubing, 5 and 6, into position at the bottom 9 of, or within, a lake 35, a river, a bay, the ocean, or the like, surrounded by ground 41. In such a lake 35 installation, a trimmie tube is not required.

An optional line 38 is also shown as being attached to the ring 34 in the embodiment of FIG. 4, and is shown as extending up to a flotation device 39, such as a buoy, or the like, to mark the location of the encasement assembly 1 at the water surface 40 of the lake 35.

Figure 5:
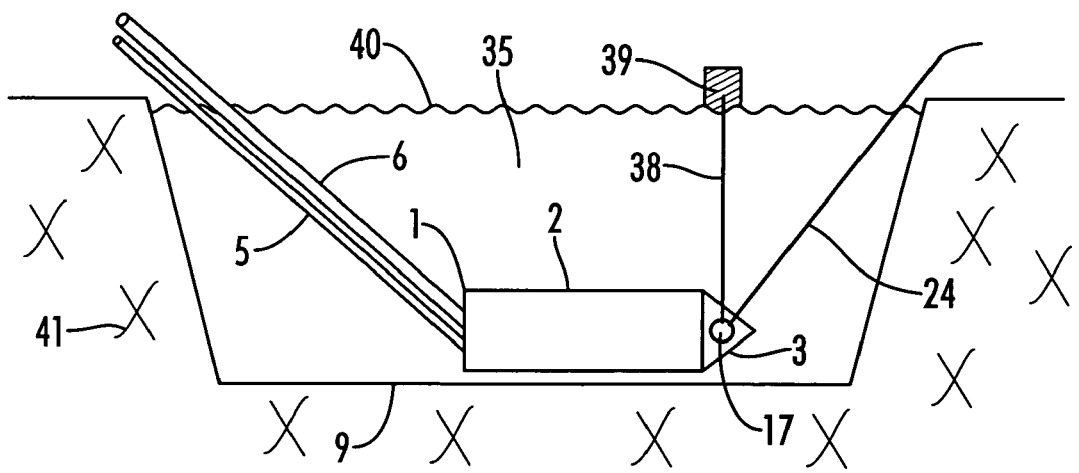
FIG. 5 is a side view of an embodiment of the encasement assembly of the present invention positioned in lake water in which the encasement tube has a small hole drilled through the nose to provide an optional attachment point for a rope and/or a marker float.

FIG. 5 is a side view of the encasement assembly 1 in which the encasement tube 2 has a small hole 17 drilled, or the like, through the cone-shaped nose 3. The hole 17 is used to provide an optional attachment point for a rope 24, such as a wire rope, a nylon rope, or the like, as would be well understood by those skilled in the art. The rope 24, in this particular application, would be utilized to pull the encasement assembly 1 and its pre-assembled attached liquid and vapor refrigerant transport tubing, 5 and 6, into position at the bottom 9 of, or within, a lake 35, a river, a bay, the ocean, or the like, surrounded by ground 41. In such a lake 35 installation, a trimmie tube (not shown in this drawing, but well understood by those skilled in the art) is not required.

An optional line 38 is also shown as being attached to the hole 17 in FIG. 5, and is shown as extending up to a flotation device 39, such as a buoy, or the like, to mark the location of the encasement assembly 1 at the lake 35 water surface 40.

Thus, although there have been described particular embodiments of the present invention of a new and useful Encasement Assembly for Installation of Sub-surface Refrigerant Tubing in a Direct Exchange Heating/Cooling System, it is not intended that such references be construed as limitations upon the scope of this invention except as set forth in the following claims.

What is claimed is:

1. An encasement assembly for installation of sub-surface refrigerant tubing in a direct exchange heating/cooling system comprising:
    an encasement tube including a main body portion having a flat upper end and a base, and a nose extending from the base of the main body portion;
    a fill material disposed in the encasement tube, the fill material having a flat upper surface located at a point spaced a recess distance below the flat upper end of the encasement tube; and
    a trimmie tube attachment piece extending upwardly from the flat upper surface of the fill material.

2. The encasement assembly of claim 1 further comprising refrigerant tubing positioned inside the encasement tube, the refrigerant tubing having a distal end positioned proximate to and above the base of the main body portion of the encasement tube.

3. The encasement assembly of claim 2 in which the fill material encases at least the distal end of the refrigerant tubing.

4. The encasement assembly of claim 1 further comprising a trimmie tube secured to the trimmie tube attachment piece.

5. The encasement assembly of claim 1 wherein the trimmie tube attachment piece comprises a first eyebolt having an upper portion extending above the upper end of the encasement tube and a lower portion disposed inside the fill material.

6. The encasement assembly of claim 5 further comprising a second eyebolt having an upper portion extending above the upper end of the encasement tube and a lower portion disposed inside the fill material.

7. The encasement assembly of claim 6 further comprising at least one of a rope, a wire, and a chain, attached to the upper portion of the second eyebolt.

8. The encasement assembly of claim 5 wherein the trimmie tube further comprises a pair of holes formed adjacent a bottom end of the trimmie tube and further comprising at least one of a release wire and a release line inserted through the pair of holes in the trimmie tube and through the upper portion of the first eyebolt.

9. The encasement assembly of claim 8 wherein the release line or wire is bent around the trimmie tube to releasably hold the trimmie tube in place when the encasement assembly is lowered into position.

10. The encasement assembly of claim 1 wherein the encasement tube is configured to be vertically positioned inside a borehole having a borehole diameter and wherein the main body portion of the encasement tube is longer than the borehole diameter.

11. The encasement assembly of claim 1 further comprising a line connection means attached to the nose of the encasement tube.

12. The encasement assembly of claim 11 wherein the line connection means comprises a nose ring.

13. The encasement assembly of claim 11 further comprising a line, comprised of at least one of a rope, a wire, and a chain, having proximal end and a distal end connected to the line connection means.

14. The encasement assembly of claim 13 further comprising a marker float connected to the proximal end of the line.

15. The encasement assembly of claim 1 wherein the fill material comprises cementitious grout.

16. The encasement assembly of claim 15 wherein the cementitious grout comprises Grout 111.

17. The encasement assembly of claim 1, in which the recess distance is approximately 2 inches.

18. A method of installing sub-surface refrigerant tubing in a direct exchange heating/cooling system comprising:
    positioning at least a distal portion of the refrigerant tubing in an encasement tube including a main body portion having a flat upper end and a base, and a nose extending from the base of the main body portion;
    positioning a trimmie tube attachment piece in the encasement tube so that an upper portion of the trimmie tube attachment piece extends above the flat upper end of the encasement tube and a lower portion of the trimmie tube attachment piece is located below a point disposed a recess distance below the flat upper end of the encasement tube;
    filling the encasement tube with a fill material until it reaches the point, the fill material having a flat upper surface located at the point;
    releasable attaching a trimmie tube to the trimmie tube attachment piece with a distal end of the trimmie tube located between the flat upper end of the encasement tube and the flat upper surface of the fill material;
    placing the encasement tube in a sub-surface location; and
    advancing grout material through the trimmie tube.

19. The method of claim 18 further comprising attaching a rope to the encasement tube and using the rope to position the encasement tube in the sub-surface location.

20. The method of claim 18 wherein the sub-surface location is a well or borehole.

21. The method of claim 18 wherein the sub-surface location is a body of water.

22. The method of claim 21 further comprising attaching a marker float to the encasement tube.

23. The method of claim 18 in which the trimmie tube attachment piece comprises a first eye bolt.

24. The method of claim 18, in which the recess distance is approximately 2 inches.

* * * * *